(12) United States Patent
Matsuyama

(10) Patent No.: US 8,458,516 B2
(45) Date of Patent: Jun. 4, 2013

(54) PROCESSOR SYSTEM AND OPERATION MODE SWITCHING METHOD FOR PROCESSOR SYSTEM

(75) Inventor: Hideki Matsuyama, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 482 days.

(21) Appl. No.: 12/656,013

(22) Filed: Jan. 13, 2010

(65) Prior Publication Data

US 2010/0218022 A1    Aug. 26, 2010

(30) Foreign Application Priority Data

Feb. 23, 2009    (JP) .................................. 2009-039845

(51) Int. Cl.
*G06F 11/00*    (2006.01)
*G06F 11/16*    (2006.01)

(52) U.S. Cl.
USPC .................. 714/12; 714/11; 714/13; 712/229

(58) Field of Classification Search
USPC ................. 714/11, 12, 13; 712/229
See application file for complete search history.

(56) References Cited

U.S. PATENT DOCUMENTS

| | | | | |
|---|---|---|---|---|
| 2,006,024 | A * | 6/1935 | Lockwood | 416/110 |
| 3,864,670 | A * | 2/1975 | Inoue et al. | 714/12 |
| 4,757,442 | A * | 7/1988 | Sakata | 714/11 |
| 5,193,175 | A * | 3/1993 | Cutts et al. | 714/11 |
| 5,784,630 | A * | 7/1998 | Saito et al. | 712/30 |
| 6,279,078 | B1 * | 8/2001 | Sicola et al. | 711/119 |
| 6,694,449 | B2 * | 2/2004 | Ghameshlu et al. | 714/11 |
| 6,961,826 | B2 * | 11/2005 | Garnett et al. | 711/144 |
| 7,134,047 | B2 * | 11/2006 | Quach | 714/11 |
| 7,290,169 | B2 | 10/2007 | Safford et al. | |
| 7,293,196 | B2 * | 11/2007 | Hicken et al. | 714/11 |
| 7,418,626 | B2 * | 8/2008 | Aino et al. | 714/12 |
| 7,496,786 | B2 * | 2/2009 | Graham et al. | 714/12 |
| 2002/0026604 | A1 * | 2/2002 | Bissett et al. | 714/12 |
| 2006/0245264 | A1 * | 11/2006 | Barr et al. | 365/189.01 |
| 2009/0204740 | A1 | 8/2009 | Weiberle et al. | |

FOREIGN PATENT DOCUMENTS

| | | |
|---|---|---|
| JP | 2005-302020 | 10/2005 |
| JP | 2006-302289 | 11/2006 |
| JP | 2008-518338 | 5/2008 |
| WO | WO 2006/045775 A1 | 5/2006 |

OTHER PUBLICATIONS

Wikipedia's Pipeline version from Dec. 22, 2009 http://en.wikipedia.org/w/index.php?title=Pipeline_(computing)&oldid=333175026.*

* cited by examiner

*Primary Examiner* — Joseph Schell
(74) *Attorney, Agent, or Firm* — McGinn IP Law Group, PLLC

(57) ABSTRACT

A processor system according to an exemplary aspect of the present invention includes a first processor, a second processor, a control unit, a signal line group, and a selection circuit. The control unit switches an operation mode between a lock step mode for the first and second processors to execute the same instruction stream and a free step mode for the first and second processors to execute different instruction streams. The signal line group includes at least one signal line disposed between a first memory circuit included in the first processor and a second memory circuit included in the second processor. The signal line group is capable of transferring a storage state of the first memory circuit to the second memory circuit. The selection circuit is capable of switching a connection destination of the second memory circuit between the second processor and the signal line group.

20 Claims, 4 Drawing Sheets

PROCESSOR SYSTEM AND OPERATION MODE SWITCHING METHOD FOR PROCESSOR SYSTEM

BACKGROUND OF THE INVENTION

1. Field of the Invention

The present invention relates to a processor system which includes at least two processors and is capable of switching an operation mode between "lock step mode" for causing the at least two processors to execute the same instruction stream and "free step mode" for causing the at least two processors to execute different instruction streams, and to an operation mode switching method for the processor system.

2. Description of Related Art

There has been known a processor system which includes at least two processors (also referred to as processor cores) and is capable of switching an operation mode of the at least two processors between "lock step mode" and "free step mode". Such a processor system is disclosed by, for example, Weiberle et al. (JP 2008-518338 A (corresponding International Patent Publication No. WO/2006/045775)) and Barr et al. (JP 2006-302289 A (corresponding US Patent Application Publication No. 2006/0245264)). In the lock step mode, two or more processors execute the same processing, and their execution results are compared with each other, thereby detecting occurrence of an error. Meanwhile; in the free step mode, two or more processors execute different processings, thereby improving the overall performance.

In addition, Safford et al. (JP 2005-302020 A (corresponding US Patent Application Publication No. 2005/0240811)) discloses a configuration for supplying the same data to first and second processors from an external circuit when the first and second processors execute the same instruction stream in the lock step mode. Specifically, Safford et al. discloses a configuration in which a selection circuit is disposed between an external circuit and a data reception unit included in the second processor. The selection circuit of the second processor is connected with a branch line from an input signal line for the first processor. While the first and second processors are executing the same instruction stream in the lock step mode, signals supplied from the external circuit to the first processor are branched to be also supplied to the selection circuit of the second processor. By controlling the selection circuit, the same data as that of the first processor is also supplied to the second processor.

SUMMARY

A processor system capable of switching an operation mode between a free step mode and a lock step mode needs to match internal states of two processors upon switching to the lock step mode. The lock step operation should be started in the state where the internal states of the two processors are consistent with each other. Otherwise, a discrepancy occurs between output data of the two processors, and in some cases, an error may be detected.

The present inventor has found a problem as described below. That is, upon switching from the free step mode to the lock step mode, the processor system capable of switching the operation mode between the free step mode and the lock step mode requires time to perform processing for matching the internal states of the two processors, i.e., storage states of memory circuits respectively included in the two processors. It is necessary to match the storage states by repeating a store instruction for outputting the contents of the memory circuit provided in one of the processors to an external shared memory, and a load instruction for transferring the storage contents of the shared memory to the memory circuit provided in the other processor, for example.

The above-mentioned three cited references fail to disclose a specific configuration for shortening the processing time for matching the internal states of two processors, and a switching technique. The cited references also fail to disclose a configuration for matching the storage states of the memory circuits, which cannot be referred to by instructions, in the processors. Note that Safford et al. discloses a configuration including a selection circuit for sharing an input signal for the two processors operating in the lock step mode. However, this configuration does not contribute to shortening of a time required for matching the internal states of the two processors, i.e., the storage states of the memory circuits respectively included in the two processors upon switching from the free step mode to the lock step mode.

A first exemplary aspect of the present invention is a processor system including a first processor, a second processor, a control unit, a signal line group, and a selection circuit.

The first processor includes a first combinational circuit and a first memory circuit that temporarily stores an output value of the first combinational circuit and supplies an input value to the first combinational circuit. The first processor performs processing in response to a supplied instruction stream. Similarly, the second processor includes a second combinational circuit and a second memory circuit that temporarily stores an output value of the second combinational circuit and supplies an input value to the second combinational circuit. The second processor performs processing in response to a supplied instruction stream. The control unit switches an operation mode between a lock step mode for the first and second processors to execute the same instruction stream and a free step mode for the first and second processors to execute different instruction streams.

Further, the signal line group includes at least one signal line disposed between the first memory circuit and the second memory circuit and is capable of transferring a storage state of the first memory circuit to the second memory circuit. Lastly, the selection circuit is capable of switching a connection destination of the second memory circuit between the second combinational circuit and the signal line group.

According to the first exemplary aspect of the present invention, the storage contents of the first memory circuit can be copied to the second memory circuit via the signal line group by controlling the operation of the selection circuit. That is, there is no need to repeat the store instruction and the load instruction to transfer the storage contents of the first memory circuit to the second memory circuit via an external shared memory. Therefore, the first exemplary aspect of the present invention contributes to shortening of the processing time required for matching the storage states of the memory circuits respectively included in the two processors.

A second exemplary aspect of the present invention is a processor system including a first processor and a second processor that are configured to be capable of switching an operation mode between a lock step mode for the first and second processors to execute the same instruction stream and a free step mode for the first and second processors to execute different instruction streams. The processor system further includes a hardware circuit that is disposed between a first memory circuit included in the first processor and a second memory circuit included in the second processor, and selectively connects the first and second memory circuits during a stop period for stopping execution of instruction streams by the first and second processors so as to switch from the free step mode to the lock step mode.

In order to match the storage states of the memory circuits included in the two processors according to the second exemplary aspect of the present invention, the first and second memory circuits may be connected with each other by the hardware circuit, upon switching from the free step mode to the lock step mode. There is no need to repeat the store instruction and the load instruction to match the storage contents of the two processors. Therefore, the second exemplary aspect of the present invention also contributes to shortening of the processing time required for matching the storage contents.

According to the first and second exemplary aspects of the present invention, it is possible to shorten a time required for matching storage states of memory circuits respectively included in two processors upon switching from the free step mode to the lock step mode.

BRIEF DESCRIPTION OF THE DRAWINGS

The above and other exemplary aspects, advantages and features will be more apparent from the following description of certain exemplary embodiments taken in conjunction with the accompanying drawings, in which.

DESCRIPTION OF THE EXEMPLARY EMBODIMENTS

Figure 1:
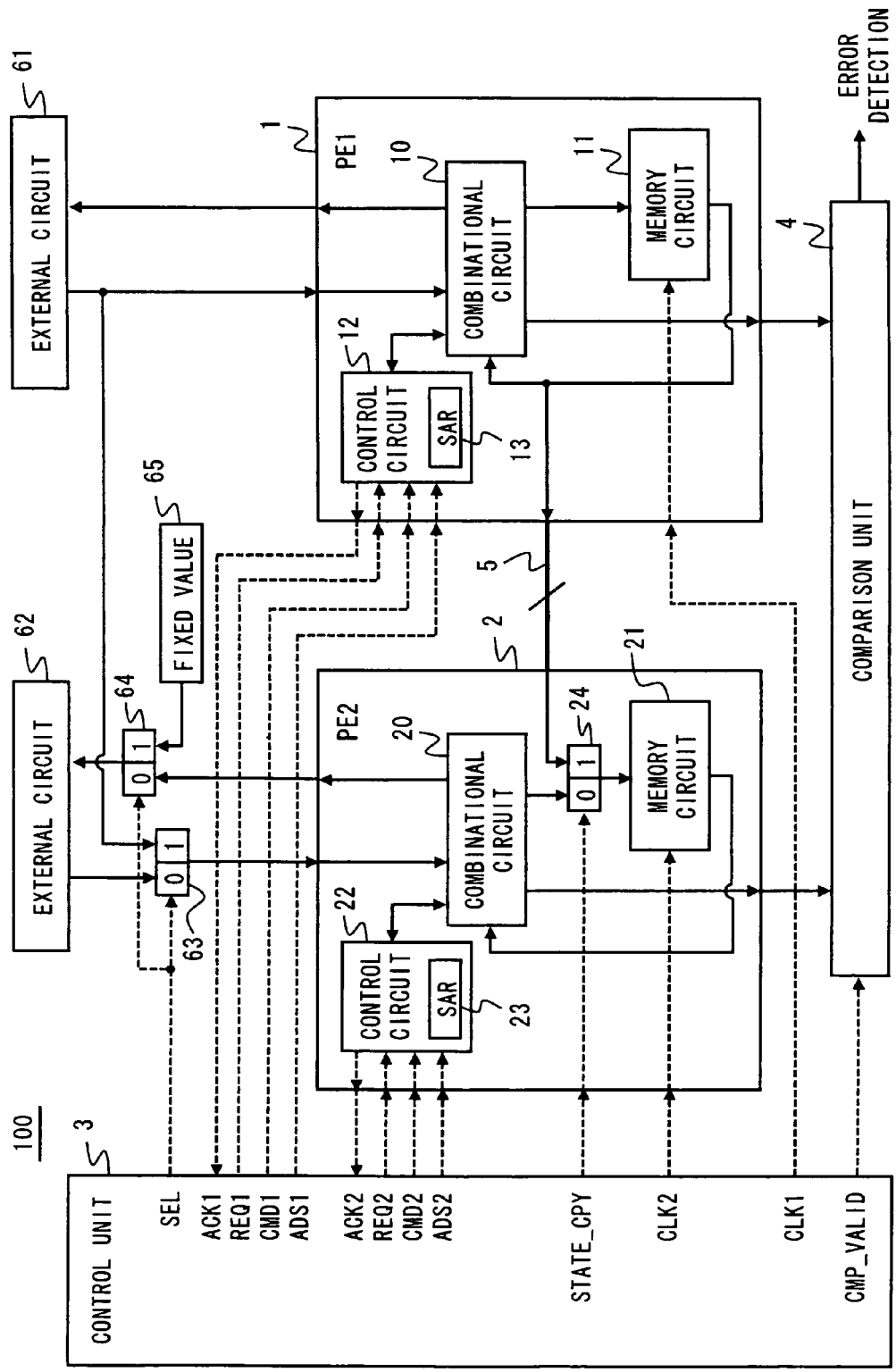
FIG. 1 is a block diagram showing a configuration of a processor system according to a first exemplary embodiment of the present invention.

Exemplary embodiments of the present invention will be described in detail below with reference to the accompanying drawings. In the drawings, the same components are denoted by the same reference numerals, and a redundant explanation thereof is omitted as appropriate to clarity the explanation.
[First Exemplary Embodiment]

A processor system 100 according to a first exemplary embodiment of the present invention includes processors 1 and 2. The processor system 100 can switch an operation mode between a lock step mode for the processors 1 and 2 to execute the same instruction stream and a free step mode for the processors 1 and 2 to execute different instruction streams. FIG. 1 is a block diagram showing an exemplary configuration of the system 100. In the exemplary configuration shown in FIG. 1, the processor 1 serves as a master processor and the processor 2 serves as a checker processor during the lock step mode. Specifically, during the lock step mode, calculation results from the processor 1 are output to an external circuit 61, and an output of the processor 2 to an external circuit 62 is disabled. Hereinafter, the components shown in FIG. 1 will be described in turn.

Each of the processors 1 and 2 fetches a program, i.e., an instruction stream, and decodes the fetched instructions. Further, each of the processors 1 and 2 executes processing, such as arithmetic operation, logical operation, comparison, and shift, in response to the decoded instructions. Programs (tasks) that require a high degree of security are executed in the lock step mode, namely, executed redundantly by the processors 1 and 2. Meanwhile, ordinary programs (tasks) requiring a low degree of security is executed in the free step mode, namely, distributed to one of the processors 1 and 2 as needed and executed.

The processor 1 includes a combinational circuit 10 and a memory circuit 11. The processor 1 fetches a instruction, decodes the instruction and executes arithmetic processing corresponding to the decoded instruction, by coupling of the combinational circuit 10 and the memory circuit 11. For example, the combinational circuit 10 includes logic gates (NOT, AND, OR, XOR, NOR, NAND, and the like), an encoder, a decoder, a multiplexer, a demultiplexer, a barrel shifter, a comparator, and adder, and a multiplier.

The memory circuit 11 includes memory elements and stores an internal state of the processor 1 and an execution state of the processing corresponding to instructions executed in the processor 1. The memory elements included in the memory circuit 11 store values input to the combinational circuit 10 and values output from the combinational circuit 10. For example, the memory circuit 11 includes latches, F/Fs, registers, and internal caches (SRAM (Static Random Access Memory)). Herein, the registers include special-purpose registers such as program counters and PSW (Program Status Word) registers, general-purpose registers, pipeline registers, and various address registers.

Sequential circuits such as counters (e.g., up/down counter, N-ary counter, and ring counter) are each formed by coupling of at least one arithmetic element included in the combinational circuit 10 and at least one memory element included in the memory circuit 11. That is, functional elements necessary for execution of instructions in the processor 1, such as an instruction fetcher (sequencer), an instruction decoder, a register file, and an ALU (Arithmetic Logic Unit), are formed by coupling of the combinational circuit 10 and the memory circuit 11.

The processor 1 also includes a control circuit 12. The control circuit 12 serves as a sequencer that performs predetermined operation and calculation for switching of the operation mode of the processor 1, in response to control signals from a control unit 3 which is described later. More specifically, the control circuit 12 performs control to stop the execution of instructions by the combinational circuit 10 and the memory circuit 11, in response to control signals (REQ1, CMD1, and ADS1 in FIG. 1) from the control unit 3. The control circuit 12 includes a start address register (SAR) 13. The SAR 13 holds a start address supplied from the control unit 3. The start address indicates an initial address at the time of starting operation in the free step mode, and is supplied from the control unit 3 to the processor 1 when the operation mode shifts from the lock step mode to the free step mode.

Like the processor 1 described above, the processor 2 includes a combinational circuit 20, a memory circuit 21, a control circuit 22, and an SAR 23. Functional elements necessary for executing instructions in the processor 2, such as an instruction fetcher (sequencer), an instruction decoder, a register file, and an ALU (Arithmetic Logic Unit), are formed by coupling of the combinational circuit 20 and the memory circuit 21.

Further, a selection circuit 24 is disposed between the combinational circuit 20 and the memory circuit 21 of the processor 2 that serves as a checker processor during the lock step mode. The selection circuit 24 switches a connection destination of the memory circuit 21 between the combinational circuit 20 and a signal line group 5, in response to a control signal (STATE_CPY in FIG. 1) from the control unit 3 which is described later. The signal line group 5 includes signal lines connecting the processors 1 and 2 to each other.

The signal line group 5 connects one input of the selection circuit 24 and the memory circuit 11 of the processor 1. Note that a simple 2:1 multiplexer, for example, may be used as the selection circuit 24.

The selection circuit 24 operates in response to the control signal from the control unit 3, so that the memory circuits 11 and 21 are selectively connected to each other during a stop period for stopping execution of instruction streams by the first and second processors so as to switch from the free step mode to the lock step mode. As a result, the stored data of the memory circuit 11 is transmitted through the signal line group 5, and the storage state of the memory circuit 11 is copied to the memory circuit 21.

The control unit 3 controls switching of the operation mode of each of the processors 1 and 2. The control unit 3 starts to control the switching of the operation mode in response to various triggers. For example, the switching of the operation mode is performed in response to a periodic timer interrupt, an external request (e.g., user operation or a request from an external device), or a request from an OS (operating system) or from an application program executed by the processor 1 or the processor 2. A specific example of the procedure for switching the operation mode by the control unit 3 will be described later.

A comparison unit 4 is enabled during the lock step mode, and compares the processing results of the processors 1 and 2 to detect the occurrence of an error based on the presence or absence of a discrepancy between the processing results.

The external circuit 61 is an interface for connecting the processor 1 to peripheral devices such as an external memory, a D/A converter, and a communication controller. Similarly, the external circuit 62 is an interface for connecting the processor 2 to peripheral devices. In the configuration example shown in FIG. 1, selection circuits 63 and 64 are disposed between the processor 2 and the external circuit 62 so as to switch the input and output of the processor 2 according to the change of the operation mode.

The selection circuit 63 operates in response to a control signal (SEL in FIG. 1) from the control unit 3. The selection circuit 63 supplies a signal received from the external circuit 62 to the processor 2 during the free step mode, and supplies a signal, which is received from the external circuit 61 and common to the processor 1, during the lock step mode.

The selection circuit 64 operates in response to the control signal (SEL in FIG. 1) from the control unit 3, and supplies a signal output from the processor 2 to the external circuit 62 during the free step mode. Meanwhile, during the lock step mode, the selection circuit 64 interrupts the supply of the signal output from the processor 2 to the external circuit 62. In the exemplary configuration of FIG. 1, an output of a fixed value generation circuit 65 that generates a predetermined fixed value is supplied to the external circuit 62 during the lock step mode. Note that the connection relationship among the processors 1 and 2 and the external circuits 61 and 62 shown in FIG. 1 are illustrated by way of example. Depending on the use of the processor system 100, the output of the processor 1 during the lock step mode may be branched and supplied to both the external circuits 61 and 62, for example.

Figure 2:
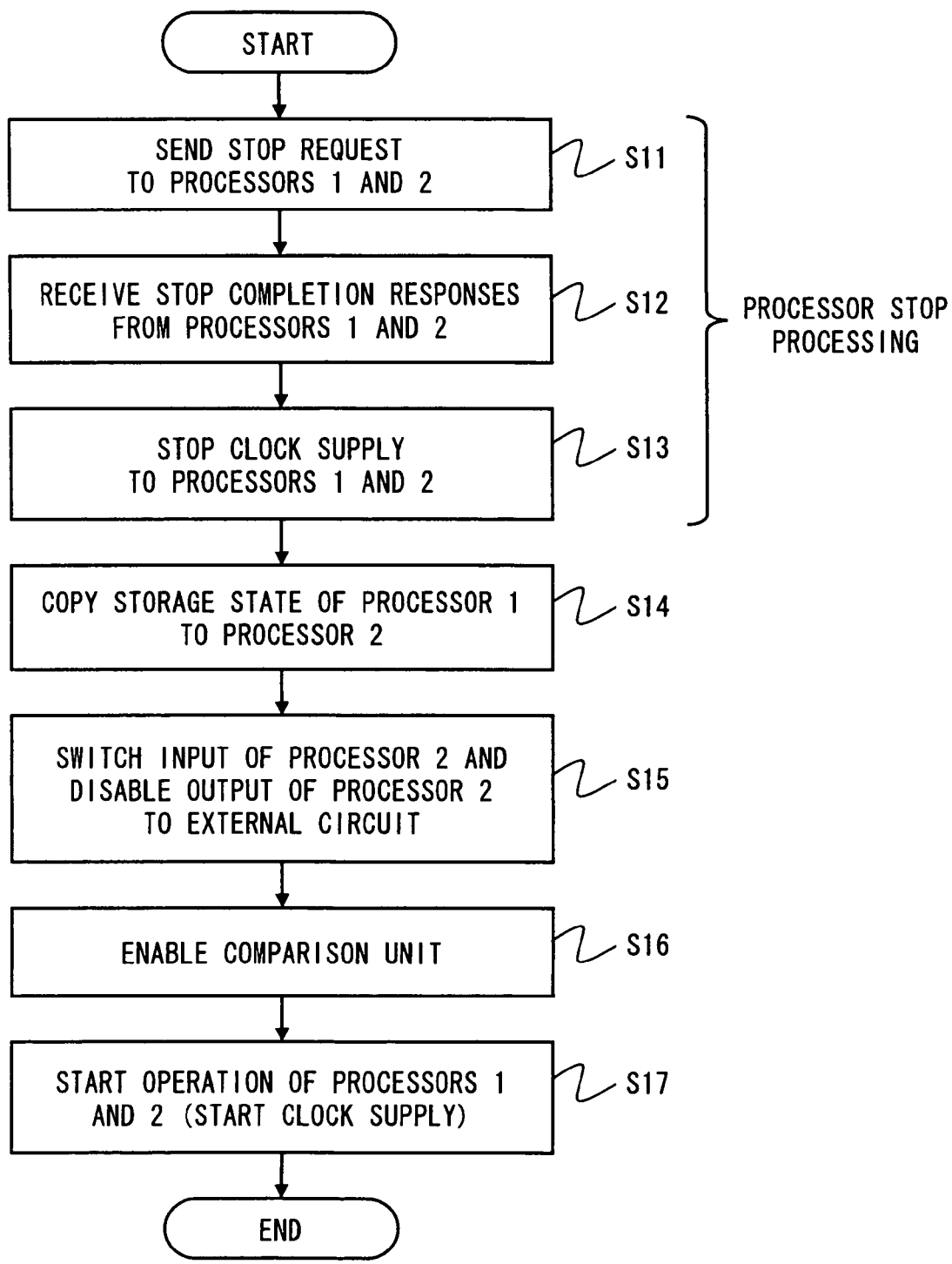
FIG. 2 is a flowchart showing a control procedure for switching from a free step mode to a lock step mode executed by a control unit shown in FIG. 1.

Next, the procedure for switching the operation mode by the control unit 3 will be described in detail below. FIG. 2 is a flowchart showing a specific example of the procedure for switching from the free step mode to the lock step mode. Steps S11 to S13 involve processing for stopping the execution of instruction streams by the processors 1 and 2. In Step S11, the control unit 3 sends a stop request to each of the processors 1 and 2. In the configuration example of FIG. 1, the stop request to the processor 1 may be implemented by setting the REQ1 signal to a value (e.g., 1) which indicates "REQUEST PRESENT" and by setting the CMD1 signal to a value which indicates "STOP REQUEST". Likewise, the stop request to the processor 2 may be implemented by setting an REQ2 signal to a value (e.g., 1) which indicates "REQUEST PRESENT" and by setting a CMD2 signal to a value which indicates "STOP REQUEST".

The processors 1 and 2 execute stop processing in response to the stop request in Step S11. Specifically, the processors 1 and 2 may execute the steps of: (i) stopping acquisition of a new instruction, (ii) processing all instructions residing in the processors, and (iii) sending stop completion responses (ACK1 and ACK2 of FIG. 1) to the control unit 3 upon completion of the processing for all the instructions residing in the processors. Upon receiving the stop completion responses from both the processors 1 and 2 (S12), the control unit 3 withdraws the request made to the processors 1 and 2 and stops the supply of clocks (CLK1 and CLK2) to the processors 1 and 2. The withdrawal of the request may be performed by setting the REQ1 signal and the REQ2 signal to a value (e.g., 0) which indicates "NO REQUEST".

That is, the control unit 3 issues the stop request to give the processors 1 and 2 advance notice of switching the operation mode. Upon receiving the stop completion response and confirming that the processors 1 and 2 are ready to be switched, the control unit 3 executes switching processing in Step S14 and subsequent steps described later. This makes it possible to prevent abnormal task termination during the free step mode.

In Step S14, the state of the processor 1, i.e., the storage state of the memory circuit 11 is copied to the memory circuit 21 of the processor 2. The storage state of the memory circuit 11 can be copied to the memory circuit 21 by the following procedure. First, the selection circuit 24 is caused to select the signal line group 5. In the configuration example of FIG. 1, the value of the STATE_CPY signal is set to "1", whereby the selection circuit 24 selects the signal line group 5. As a result, the storage state of the memory circuit 11 is supplied to the memory circuit 21. In this state, when the clock CLK2 of the processor 2 is supplied only for one clock period, the storage state of the memory circuit 11 is loaded into the memory circuit 21. After the copy is completed, the value of the STATE_CPY signal is reset to "0".

In Step S15, the selection circuits 63 and 64 are controlled so that an input of each of the master processor 1 and the checker processor 2 is switched to the external circuit 61 and an output of the checker processor 2 to the external circuit 62 is disabled. In the configuration example of FIG. 1, the value of the SEL signal may be set to "1".

In Step S16, the comparison unit 4 is enabled. This may be performed by setting a CMP_VALID signal for controlling the comparison unit 4 to a value (e.g., 1) which indicates "ENABLE".

Lastly, in Step S17, the supply of the clocks (CLK1 and CLK2) to the processors 1 and 2 is resumed to start operation of each of the processors 1 and 2 in the lock step mode.

Figure 3:
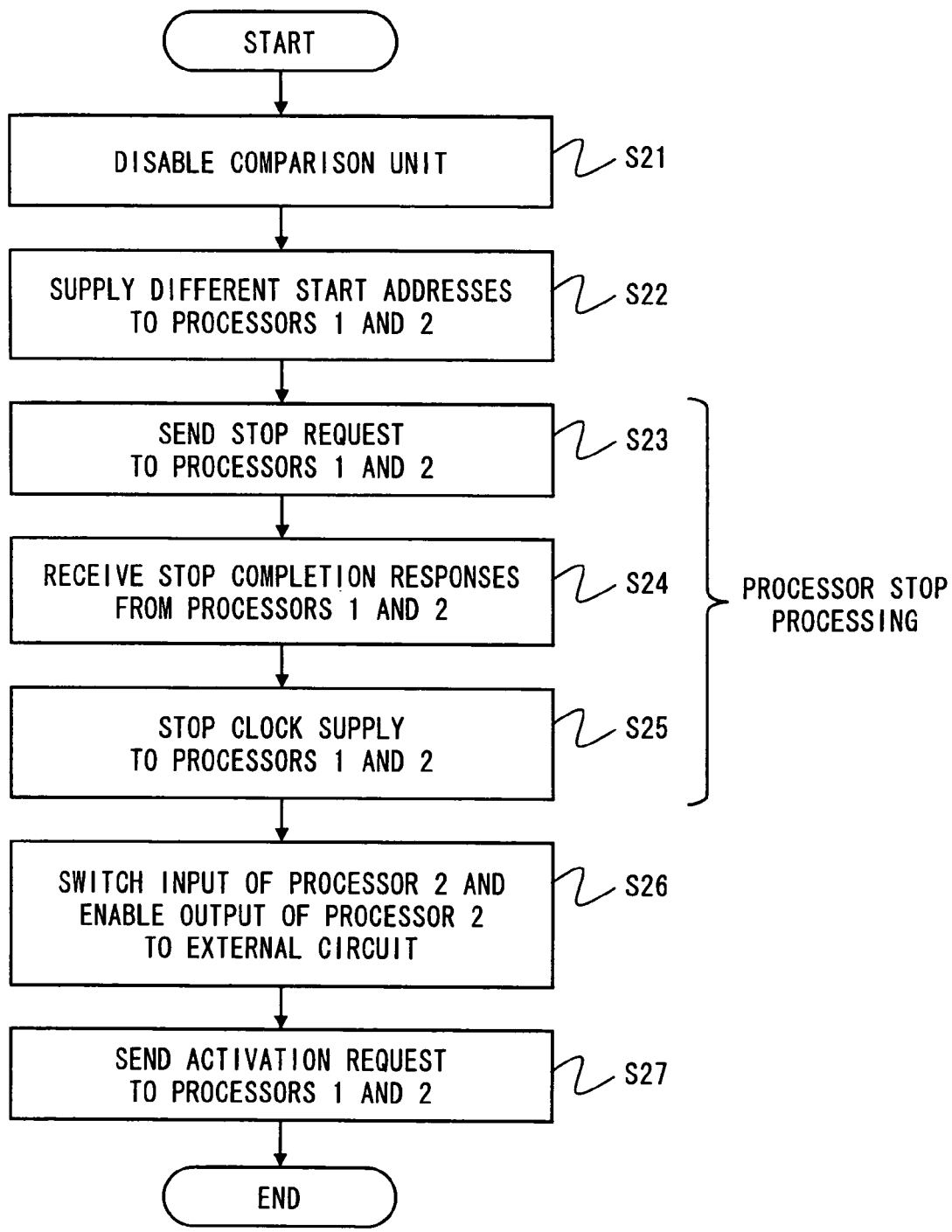
FIG. 3 is a flowchart showing a control procedure for switching from the lock step mode to the free step mode executed by the control unit shown in FIG. 1.

Referring next to FIG. 3, the procedure for switching the operation mode from the lock step mode to the free step mode will be described. The flowchart of FIG. 3 shows a specific example of the processing procedure executed by the control unit when the operation mode is switched from the lock step mode to the free step mode.

In Step S21 of FIG. 3, the comparison unit 4 is disabled. This may be performed by setting the CMP_VALID signal for controlling the comparison unit 4 to a value (e.g., 0) which indicates "DISABLE".

In Step S22, the start address of the processor 1 at the time of operation in the free step mode is set to the SAR 13 by the control unit 3. This may be performed by setting the REQ1 signal to a value (e.g., 1) which indicates "REQUEST PRESENT", setting the CMD1 signal to a value which indicates "START ADDRESS SET", and by setting the start address to the ADS1 signal. Likewise, the start address of the processor 2 operating in the free step mode is set to the SAR 23 by the control unit 3.

Steps S23 to S25 involve processing for stopping the execution of instruction streams by the processors 1 and 2. The contents of these processings are similar to those of Steps S11 to S13 which are described above regarding the switching from the free step mode to the lock step mode.

In Step S26, the selection circuits 63 and 64 are controlled so that the input of the processor 2 is switched to the external circuit 62 and the output of the checker processor 2 to the external circuit 62 is enabled. In the configuration example of FIG. 1, the value of the SEL signal may be set to "0".

Lastly, in Step S27, an activation request is issued to each of the processors 1 and 2. Specifically, the supply of clocks (CLK1 and CLK2) to the processors 1 and 2 may be resumed to send the activation request to each of the processors 1 and 2. The transmission of the activation request may be performed by setting a value (e.g., 1), which indicates "REQUEST PRESENT", to the REQ1 signal and by setting a value, which indicates "ACTIVATION REQUEST", to the CMD1 signal.

In the exemplary embodiment described with reference to FIGS. 1 and 3, different start addresses are assigned to the processors 1 and 2 in advance from the control unit 3 when the operation mode is switched to the free step mode. This eliminates the need for processing to cause one of the processors to operate first and assign a start address to the other processor to be activated. Therefore, according to this exemplary embodiment of the present invention, the processors 1 and 2 can be rapidly brought into a state where the processors 1 and 2 can execute effective tasks, such as a user task, independently of each other.

As described above, the processor system 100 according to this exemplary embodiment includes hardware circuits, i.e., the signal line group 5 and the selection circuit 24, which are disposed between the memory circuits 11 and 21. The selection circuit 24 is caused to operate during the switching to the lock step mode, thereby copying the storage state of the memory circuit 11 to the memory circuit 21. This makes it possible to match the internal states of the processors 1 and 2 without the need for the processors 1 and 2 to execute instructions such as a store instruction, a load instruction, and a copy instruction.

Further, mentioned above, conventional processor systems have a problem that it is difficult to match the storage states of memory circuits (e.g., pipeline registers) which cannot be referred to by instructions. Meanwhile, in the processor system 100 according to this exemplary embodiment, the signal line group 5 and the selection circuit 24 are disposed between the memory elements which can hardly be referred to by instructions, thereby making it possible to match the storage states of the memory elements without relying on instruction operation.

While this exemplary embodiment focuses on the two processors 1 and 2 to facilitate the explanation, the processor system 100 may include three or more processors. To achieve high-speed transfer, a number of signal lines included in the groups 5 corresponding to the number of memory elements to be copied may be provided. Alternatively, if there are constraints on wiring space, for example, a serializer may be disposed to thereby reduce the number of signal lines between the processors 1 and 2. Ultimately, the number of signal lines included in the groups 5 may be the same as the number of memory elements to be copied, or may be only one.

The entire memory circuits disposed in the processors 1 and 2 for executing instruction streams are not necessarily used as the memory elements to be copied using the signal line group 5 and the selection circuit 24. Even if the storage contents of the processors 1 and 2 are not consistent with each other at the start of operation in the lock step mode, for example, memory elements which hardly cause a discrepancy between the outputs of the processors 1 and 2 may be excluded from copy targets.

Storage states of a part of the memory elements, the storage states of which should be matched at the start of operation in the lock step mode, may be matched between the processors 1 and 2 by executing a load instruction, a store instruction, a copy instruction, and the like. Also in this case, the total time required for copy processing can be shortened compared to the case where the storage states of all the memory elements are matched by executing the load instruction, the store instruction, the copy instruction, and the like.

A part of memory elements, the storage states of which should be matched at the start of operation in the lock step mode, may be updated by a predetermined value that is common to the processors 1 and 2. This modified example will be described as a second exemplary embodiment of the present invention.

[Second Exemplary Embodiment]

A processor system 200 according to the second exemplary embodiment of the present invention includes processors 7 and 8. Like the system 100 described above, the system 200 can switch the operation mode between the lock step mode for the processors 7 and 8 to execute the same instruction stream and the free step mode for the processors 7 and 8 to execute different instruction streams.

Figure 4:
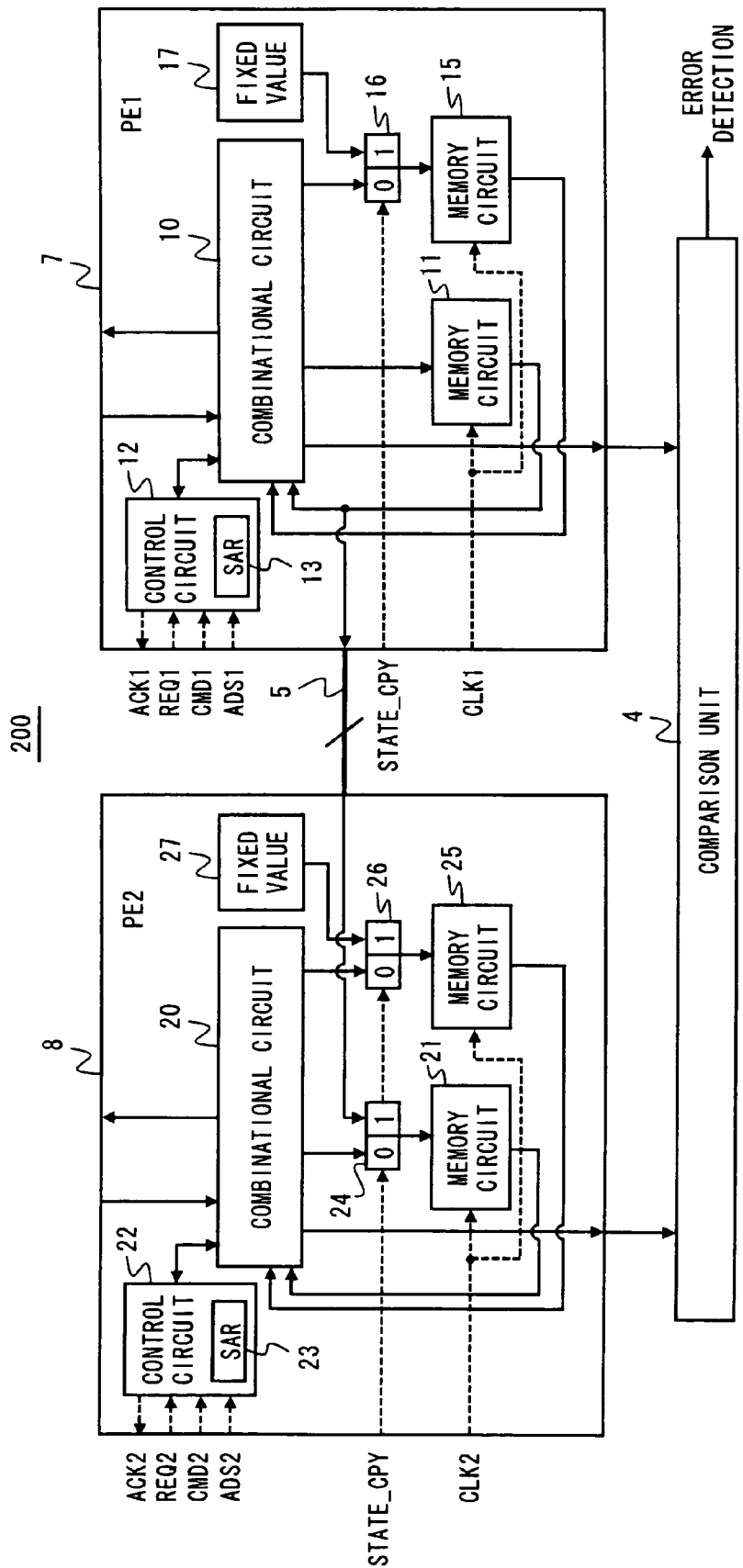
FIG. 4 is a block diagram showing a configuration of a processor system according to a second exemplary embodiment of the present invention.

FIG. 4 is a block diagram showing an exemplary configuration of the processor system 200. Although not shown in FIG. 4, the system 200 includes the control unit 3, the external circuits 61 and 62, and the selection circuits 63 and 64, like the system 100. In the configuration example of FIG. 4, the processor 7 serves as a master processor and the processor 8 serves as a checker processor during the lock step mode.

The processor 7 shown in FIG. 4 includes a memory circuit 15, a selection circuit 16, and a fixed value generation circuit 17, in addition to the components included in the processor 1.

The memory circuit 15 includes multiple memory elements and stores the internal state of the processor 1 in a similar manner as the memory circuit 11. When the operation mode is switched from the free step mode to the lock step mode, however, the storage state of the memory circuit 15 is not transferred to the processor 2. Instead, the memory circuit 15 is updated by a fixed value which is generated by the fixed value generation circuit 17. The selection circuit 16 is provided for updating of the memory circuit 15 by the fixed value. The selection circuit 16 switches a connection destination of the memory circuit 15 between the combinational circuit 10 and the fixed value generation circuit 17, in response to a control signal from the control unit 3. Note that the selection circuit 16 may be controlled by supplying the STATE_CPY signal, which is common to the selection circuit 24, to the selection circuit 16.

The processor 8 shown in FIG. 4 includes a memory circuit 25, a selection circuit 26, and a fixed value generation circuit 27, in addition to the components included in the processor 2. The roles and operations of these components are similar to those of the memory circuit 15, the selection circuit 16, and the fixed value generation circuit 17 which are included in the processor 7.

The procedure for switching the operation mode of the processor system 200 may be similar to that of the system 100 described above with reference to FIGS. 2 and 3. Note that the update of the memory circuits 15 and 25 by the fixed value may be performed in parallel with the processing of Step S14 in FIG. 2, i.e., the operation of copying from the memory circuit 11 of the processor 1 to the memory circuit 21 of the processor 2. In the configuration example of FIG. 4, the control signal (STATE_CPY), which is common to the selection circuit 24, is supplied to each of the selection circuits 16 and 26. For this reason, the update of the memory circuit 25 of the processor 2 by the fixed value is performed simultaneously with the operation of copying the storage state of the memory circuit 11 to the memory circuit 21. Meanwhile, the clock CLK1 of the processor 1 is supplied only for one clock period, whereby the storage state of the memory circuit 15 is updated by the fixed value.

As described in this exemplary embodiment, a part of the memory elements included in the processors 7 and 8 is updated by the fixed value when the operation mode is switched to the lock step mode. This leads to a reduction in the number of signal lines included in the signal line groups 5.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A processor system comprising:
   a first processor comprising a first combinational circuit and a first memory circuit that temporarily stores an output value of the first combinational circuit and supplies an input value to the first combinational circuit, the first processor being configured to perform processing in response to a supplied instruction stream;
   a second processor comprising a second combinational circuit and a second memory circuit that temporarily stores an output value of the second combinational circuit and supplies an input value to the second combinational circuit, the second processor being configured to perform processing in response to a supplied instruction stream;
   a control unit that switches an operation mode between a lock step mode for the first and second processors to execute a same instruction stream and a free step mode for the first and second processors to execute different instruction streams;
   a signal line group that includes at least one signal line disposed between the first memory circuit and the second memory circuit and is capable of transferring a storage state of the first memory circuit to the second memory circuit; and
   a selection circuit capable of switching a connection destination of the second memory circuit between the second combinational circuit and the signal line group.

2. The processor system according to claim 1, wherein the selection circuit operates in accordance with a control by the control unit,
   the selection circuit is controlled to connect the second memory circuit to the signal line group during a first stop period for stopping an execution of instruction streams by the first and second processors so as to switch from the free step mode to the lock step mode, and
   the selection circuit is controlled to connect the second memory circuit to the second combinational circuit during the execution of instruction streams by the first and second processors.

3. The processor system according to claim 1, wherein the signal line group and the selection circuit are configured to connect a first part of a first plurality of memory elements included in the first memory circuit and a first part of a second plurality of memory elements included in the second memory circuit, and
   at least a part of a second part of the first plurality of memory elements and at least a part of a second part of the second plurality of memory elements are updated with a predetermined fixed value during a first stop period.

4. The processor system according to claim 3, wherein each of the first and second processors further comprises a fixed value generation circuit that generates the predetermined fixed value.

5. The processor system according to claim 1, wherein each of the first and second processors further comprises a start address holding circuit capable of holding a start address for use in starting the free step mode,
   the control unit supplies different start addresses to the start address holding circuits of the first and second processors during a second stop period for stopping execution of instruction streams by the first and second processors so as to switch from the lock step mode to the free step mode, and
   the first and second processors are configured to fetch the start addresses held in the start address holding circuits of the first and second processors and resume execution, upon returning from the second stop period.

6. The processor system according to claim 1, wherein the control unit is configured to send a stop request to each of the first and second processors when the operation mode is switched,
   the first and second processors are configured to stop execution of instruction streams in response to the stop request and to send a stop completion response to the control unit, and
   the control unit stops a clock supply to the first and second processors on a condition of receiving the stop completion response from the first and second processors.

7. The processor system according to claim 6, wherein processing executed by the first and second processors in response to the stop request comprises:
   stopping an acquisition of a new instruction;
   processing any instructions residing in the processors; and
   sending the stop completion response upon completion of any instructions residing in the processors.

8. The processor system according to claim 1, wherein each of the first and second memory circuits includes at least one of a program counter, a program status word (PSW) register, and a pipeline register.

9. The processor system according to claim 1, wherein at least a part of a first plurality of memory elements included in the first memory circuit and at least a part of a second plurality of memory elements included in the second memory circuit are updated by a predetermined fixed value during the first stop period.

10. The processor system according to claim 1, wherein each of the first and second processors further comprises a start address holding circuit capable of holding a start address for use in starting the free step mode, and the control unit supplies different start addresses to the start address holding circuits of the first and second processors during a second stop period for stopping execution of instruction streams by the first and second processors so as to switch from the lock step mode to the free step mode.

11. The processor system according to claim 1, wherein the control unit stops a clock supply to the first and second processors on a condition of receiving a stop completion response from the first and second processors.

12. The processor system according to claim 1, wherein the storage state of the first memory circuit includes at least one of an internal state of the first processor and an execution state of the first processor.

13. A processor system comprising:

a first processor and a second processor that are configured to be capable of switching an operation mode between a lock step mode for the first and second processors to execute a same instruction stream and a free step mode for the first and second processors to execute different instruction streams; and a hardware circuit that is disposed between a first memory circuit included in the first processor and a second memory circuit included in the second processor, and said hardware circuit selectively connects the first and second memory circuits during a stop period for stopping execution of instruction streams by the first and second processors so as to switch from the free step mode to the lock step mode.

14. The processor system according to claim 13, wherein the hardware circuit is configured to connect a first part of a first plurality of memory elements included in the first memory circuit and a first part of a second plurality of memory elements included in the second memory circuit, and at least a part of a second part of the first plurality of memory elements and at least a part of a second part of the second plurality of memory elements are updated with a predetermined fixed value during the stop period.

15. The processor system according to claim 14, wherein each of the first and second processors further comprises a fixed value generation circuit that generates the fixed value.

16. The processor system according to claim 13, wherein, the first memory circuit is configured to store at least one of an internal state of the first processor and an execution state of the first processor, and the hardware circuit is configured to transfer the at least one of the internal state and the execution state stored in the first memory circuit to the second memory circuit.

17. An operation mode switching method for a processor system including a first processor and a second processor, the processor system being configured to be capable of switching an operation mode between a lock step mode for the first and second processors to execute a same instruction stream and a free step mode for the first and second processors to execute different instruction streams, the first processor comprising a first combinational circuit and a first memory circuit that temporarily stores an output value of the first combinational circuit and supplies an input value to the first combinational circuit, the second processor comprising a second combinational circuit and a second memory circuit that temporarily stores an output value of the second combinational circuit and supplies an input value to the second combinational circuit, the operation mode switching method comprising:

transferring a storage state of the first memory circuit to the second memory circuit during a first stop period for stopping execution of instruction streams by the first and second processors so as to switch from the free step mode to the lock step mode, by controlling a selection circuit disposed between the first memory circuit and the second memory circuit.

18. The operation mode switching method according to claim 17, wherein each of the first and second processors further comprises a start address holding circuit capable of holding a start address for use in starting the free step mode, and the operation mode switching method further comprises:

supplying different start addresses to the start address holding circuits of the first and second processors during a second stop period for stopping execution of instruction streams by the first and second processors so as to switch from the lock step mode to the free step mode; and fetching, by the first and second processors, the start addresses held in the start address holding circuits of the first and second processors and resuming execution, upon returning from the second stop period.

19. The operation mode switching method according to claim 17, further comprising:

sending a stop request to each of the first and second processors when the operation mode is switched;

stopping execution of instruction streams by the first and second processors in response to the stop request, and sending a stop completion response to the control unit; and stopping a clock supply to the first and second processors on condition of receiving the stop completion response from the first and second processors.

20. The operation mode switching method according to claim 19, wherein processing executed by the first and second processors in response to the stop request comprises:

stopping an acquisition of a new instruction;

processing any instructions residing in the processors; and sending the stop completion response upon completion of any instructions residing in the Processors.

* * * * *